(12) United States Patent
Hasegawa et al.

(10) Patent No.: US 11,926,312 B2
(45) Date of Patent: Mar. 12, 2024

(54) CONTROL DEVICE OF VEHICLE

(71) Applicant: TOYOTA JIDOSHA KABUSHIKI KAISHA, Toyota (JP)

(72) Inventors: Yoshio Hasegawa, Okazaki (JP); Tomohiro Chimbe, Kariya (JP); Shogo Kawai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 267 days.

(21) Appl. No.: 17/674,317

(22) Filed: Feb. 17, 2022

(65) Prior Publication Data
US 2022/0281437 A1    Sep. 8, 2022

(30) Foreign Application Priority Data
Mar. 4, 2021    (JP) .................................. 2021-034841

(51) Int. Cl.
| | | |
|---|---|---|
| *B60W 20/30* | (2016.01) | |
| *B60W 20/20* | (2016.01) | |
| *B60W 40/09* | (2012.01) | |
| *F16H 61/04* | (2006.01) | |

(52) U.S. Cl.
CPC ............ *B60W 20/30* (2013.01); *B60W 20/20* (2013.01); *B60W 40/09* (2013.01); *B60W 2510/081* (2013.01); *B60W 2510/10* (2013.01); *F16H 2061/0481* (2013.01); *F16H 2061/0485* (2013.01); *F16H 2061/0488* (2013.01)

(58) Field of Classification Search
None
See application file for complete search history.

(56) References Cited

U.S. PATENT DOCUMENTS

| | | |
|---|---|---|
| 2009/0131216 A1 | 5/2009 | Matsubara et al. |
| 2012/0290158 A1 | 11/2012 | Yoshikawa |
| 2015/0336571 A1 | 11/2015 | Kuwahara et al. |
| 2017/0101084 A1 | 4/2017 | Yoon et al. |
| 2021/0276537 A1 | 9/2021 | Hasegawa et al. |

FOREIGN PATENT DOCUMENTS

| | | |
|---|---|---|
| JP | 2007-118723 A | 5/2007 |
| JP | 2015-217914 A | 12/2015 |
| JP | 2021-138289 A | 9/2021 |
| WO | 2011/092856 A1 | 8/2011 |

*Primary Examiner* — Peter D Nolan
*Assistant Examiner* — Michael F Whalen
(74) *Attorney, Agent, or Firm* — Oliff PLC (57) ABSTRACT

In a case where a predetermined switching operation to a state in which a traveling position is selected from a state in which another shift position of a mechanical transmission device is selected is performed by a driver, a quick engagement command to quickly engage a predetermined engagement device is performed in a state in which output of a predetermined torque is stopped, and then a rapid garage control of increasing a rotation speed of an electric motor at a rotation speed equal to or higher than a predetermined rotation speed is executed. The rapid garage control is executed in a case where a predetermined start condition is established.

9 Claims, 3 Drawing Sheets

CONTROL DEVICE OF VEHICLE

CROSS-REFERENCE TO RELATED APPLICATION

This application claims priority to Japanese Patent Application No. 2021-034841 filed on Mar. 4, 2021, incorporated herein by reference in its entirety.

BACKGROUND

1. Technical Field

The present disclosure relates to a control device of a vehicle including a mechanical transmission device that transmits drive force from a drive force source including an electric motor.

2. Description of Related Art

A control device of a vehicle including an electric motor, and a mechanical transmission device that includes a predetermined engagement device, in which a traveling position at which the mechanical transmission device can transmit drive force from the electric motor is formed as a shift position by putting the predetermined engagement device into an engaged state. For example, there is a drive device of a hybrid vehicle disclosed in Japanese Unexamined Patent Application Publication No. 2015-217914 (JP 2015-217914 A). JP 2015-217914 A discloses that engagement of the predetermined engagement device is quickly performed by disengaging the predetermined engagement device at the time of a switching operation from a state in which the traveling position of the mechanical transmission device is selected to a state in which a non-traveling position at which the mechanical transmission device cannot transmit the drive force from the electric motor is selected, and engaging the disengaged predetermined engagement device independently at the time of a switching operation from the state in which the non-traveling position is selected to the state in which the traveling position is selected.

SUMMARY

By the way, it is conceivable that a predetermined engagement device is quickly engaged by increasing a command pressure stepwise from an engagement start point in time to a maximum pressure instead of gradually increasing the command pressure of the predetermined engagement device. However, there is a possibility that, when a torque is input to a mechanical transmission device, an engagement shock occurs when the command pressure of the predetermined engagement device is increased stepwise or the predetermined engagement device cannot be quickly engaged even when the command pressure of the predetermined engagement device is increased stepwise. Alternatively, there is a possibility that the engagement shock is likely to occur when the predetermined engagement device is quickly engaged in a state in which the predetermined engagement device has a differential rotation.

The present disclosure has been made based on the circumstances described above, and is to provide a control device of a vehicle that can suppress a shock and quickly engage a predetermined engagement device in a case where a predetermined switching operation to a traveling position from another shift position is performed.

A first aspect of the present disclosure relates to a control device of (a) a vehicle including an electric motor, and a mechanical transmission device. The mechanical transmission device includes a predetermined engagement device, in which a traveling position at which the mechanical transmission device is able to transmit drive force from the electric motor is formed as a shift position by putting the predetermined engagement device into an engaged state. The control device includes (b) an electric motor controller configured to control a rotation speed of the electric motor at a rotation speed equal to or higher than a predetermined rotation speed and output a predetermined torque that causes a creep phenomenon from the electric motor. The control device includes (c) a garage controller configured to, in a case where a predetermined switching operation from a state in which another shift position different from the traveling position of the mechanical transmission device is selected to a state in which the traveling position is selected is performed by a driver, perform a quick engagement command to increase a command pressure of the predetermined engagement device stepwise and quickly engage the predetermined engagement device in a state in which output of the predetermined torque is stopped, and then execute a rapid garage control of increasing the rotation speed of the electric motor to be equal to or higher than the predetermined rotation speed. (d) The garage controller is configured to, in a case where the predetermined switching operation is performed by the driver, execute the rapid garage control when a predetermined start condition that an engagement shock of the predetermined engagement device is suppressed is established, and prohibit the rapid garage control when the predetermined start condition is not established.

In addition, a second aspect of the present disclosure relates to the control device according to the first aspect of the present disclosure, in which the predetermined start condition may include a condition that an input rotation speed of the mechanical transmission device is equal to or lower than a predetermined input rotation speed at which the engagement shock of the predetermined engagement device is suppressed, and a condition that an output rotation speed of the mechanical transmission device is equal to or lower than a predetermined output rotation speed at which the engagement shock of the predetermined engagement device is suppressed.

In addition, a third aspect of the present disclosure relates to the control device according to the second aspect of the present disclosure, in which the input rotation speed of the mechanical transmission device may be an output rotation speed of a hydraulic transmission device provided in the vehicle and configured to transmit the drive force from the electric motor to the mechanical transmission device via fluid.

In addition, a fourth aspect of the present disclosure relates to the control device according to the second aspect or third aspect of the present disclosure, in which the predetermined start condition may include at least one condition among a condition that a drive request amount for the vehicle is equal to or less than a predetermined zero determination threshold value that is able to be determined as zero, a condition that an electric oil pump provided in the vehicle and configured to supply a hydraulic oil for operating the predetermined engagement device is normally operated, and a condition that a temperature of the hydraulic oil is within a predetermined range in which quick engagement of the predetermined engagement device is able to be appropriately performed.

In addition, a fifth aspect of the present disclosure relates to the control device according to any one of the first aspect to the fourth aspect of the present disclosure, in which the garage controller may be configured to, in a case where the predetermined start condition is not established, execute a normal garage control of performing a slow engagement command to gradually increase the command pressure of the predetermined engagement device and slowly engage the predetermined engagement device as compared with the quick engagement command.

In addition, a sixth aspect of the present disclosure relates to the control device according to any one of the first aspect to the fifth aspect of the present disclosure, in which the other shift position may be a non-traveling position at which the mechanical transmission device is not able to transmit the drive force from the electric motor.

In addition, a seventh aspect of the present disclosure relates to the control device according to any one of the first aspect to the sixth aspect of the present disclosure, in which the other shift position may be a second traveling position at which the mechanical transmission device is able to transmit the drive force from the electric motor, the second traveling position being formed by putting a second predetermined engagement device that is provided in the mechanical transmission device and is different from the predetermined engagement device into an engaged state, and the garage controller may be configured to, in a case where the predetermined switching operation from a state in which the second traveling position is selected to a state in which the traveling position is selected is performed by the driver, perform a disengagement command to reduce a command pressure of the second predetermined engagement device and disengage the second predetermined engagement device before the quick engagement command with respect to the predetermined engagement device is started.

In addition, an eighth aspect of the present disclosure relates to the control device according to any one of the first aspect to the seventh aspect of the present disclosure, in which the garage controller may be configured to, in a case where the predetermined switching operation is performed by the driver in a motor traveling mode in which the vehicle is able to travel by the drive force from the electric motor in a state in which an operation of an engine provided in the vehicle is stopped, execute the rapid garage control.

In addition, a ninth aspect of the present disclosure relates to the control device according to any one of the first aspect to the eighth aspect of the present disclosure, in which the garage controller may be configured to, in a case where the predetermined switching operation is performed by the driver in a state in which the predetermined torque is output from the electric motor, execute the rapid garage control in a state in which the output of the predetermined torque is temporarily stopped.

According to the first aspect of the present disclosure, in a case where the predetermined switching operation to a state in which the traveling position is selected from a state in which the other shift position of the mechanical transmission device is selected is performed by the driver, the quick engagement command to increase the command pressure of the predetermined engagement device stepwise and quickly engage the predetermined engagement device is performed in a state in which output of the predetermined torque is stopped, and then the rapid garage control of increasing the rotation speed of the electric motor to be equal to or higher than the predetermined rotation speed is executed, engagement of the predetermined engagement device caused by the predetermined switching operation is quickly performed in a state in which the engagement shock is easily suppressed. Moreover, the rapid garage control is executed in a case where the predetermined start condition that the engagement shock of the predetermined engagement device is suppressed is established, but is prohibited in a case where the predetermined start condition is not established, so that the engagement of the predetermined engagement device caused by the predetermined switching operation is performed in a state in which the engagement shock is more easily suppressed. Therefore, in a case where the predetermined switching operation from the other shift position to the traveling position is performed, it is possible to suppress the shock and quickly engage the predetermined engagement device. That is, in a case where the rapid garage control is executed, it is possible to suppress the shock and quickly engage the predetermined engagement device.

In addition, according to the second aspect of the present disclosure, the predetermined start condition includes the condition that the input rotation speed of the mechanical transmission device is equal to or lower than the predetermined input rotation speed at which the engagement shock of the predetermined engagement device is suppressed, and the condition that the output rotation speed of the mechanical transmission device is equal to or lower than the predetermined output rotation speed at which the engagement shock of the predetermined engagement device is suppressed, so that the engagement of the predetermined engagement device caused by the predetermined switching operation is performed in a state in which the differential rotation of the predetermined engagement device is suppressed and the engagement shock is surely suppressed.

In addition, according to the third aspect of the present disclosure, the input rotation speed of the mechanical transmission device is the output rotation speed of the hydraulic transmission device provided in the vehicle and configured to transmit the drive force from the electric motor to the mechanical transmission device, so that the predetermined start condition includes the condition that the output rotation speed of the hydraulic transmission device is equal to or lower than the predetermined input rotation speed. Therefore, in a case where the hydraulic transmission device is provided, even in a case where the input rotation speed of the hydraulic transmission device is reduced to be equal to or lower than the predetermined input rotation speed in a state in which the output of the predetermined torque is stopped when the output rotation speed of the hydraulic transmission device exceeds the predetermined input rotation speed, the output rotation speed of the hydraulic transmission device may be higher than the input rotation speed of the hydraulic transmission device due to the characteristic of the hydraulic transmission device, whereas since the rapid garage control is executed when the predetermined start condition including the condition that the output rotation speed of the hydraulic transmission device is equal to or lower than the predetermined input rotation speed is established, the engagement of the predetermined engagement device caused by the predetermined switching operation is performed in a state in which the differential rotation of the predetermined engagement device is surely suppressed.

In addition, according to the fourth aspect of the present disclosure, the predetermined start condition includes at least one condition among the condition that the drive request amount for the vehicle is equal to or less than the zero determination threshold value, the condition that the electric oil pump is normally operated, and the condition that the temperature of the hydraulic oil is within the predetermined range, so that the engagement of the predetermined engagement device caused by the predetermined switching operation is more easily performed in a state in which the differential rotation of the predetermined engagement device is suppressed.

In addition, according to the fifth aspect of the present disclosure, in a case where the predetermined start condition is not established, the normal garage control of performing the slow engagement command to gradually increase the command pressure of the predetermined engagement device and slowly engage the predetermined engagement device as compared with the quick engagement command is executed, so that the engagement of the predetermined engagement device caused by the predetermined switching operation is performed in a state in which the engagement shock is easily suppressed.

In addition, according to the sixth aspect of the present disclosure, the other shift position is the non-traveling position at which the mechanical transmission device is not able to transmit the drive force from the electric motor, so that it is possible to suppress the shock and quickly engage the predetermined engagement device in a case where the predetermined switching operation from the non-traveling position to the traveling position is performed.

In addition, according to the seventh aspect of the present disclosure, the other shift position is the second traveling position formed by putting the second predetermined engagement device into the engaged state, so that it is possible to suppress the shock and quickly engage the predetermined engagement device in a case where the predetermined switching operation from the second traveling position to the traveling position is performed. Moreover, in a case where the predetermined switching operation from the second traveling position to the traveling position is performed, the disengagement command to disengage the second predetermined engagement device before the quick engagement command is started, switching the shift position from the second traveling position to the traveling position is appropriately executed by the rapid garage control.

In addition, according to the eighth aspect of the present disclosure, in a case where the predetermined switching operation is performed in the motor traveling mode in which the vehicle is able to travel by the drive force from the electric motor in a state in which the operation of the engine is stopped, the rapid garage control is executed, so that the rapid garage control is appropriately executed in a situation in which there is a possibility that the predetermined torque that causes the creep phenomenon is output from the electric motor.

In addition, according to the ninth aspect of the present disclosure, in a case where the predetermined switching operation is performed in a state in which the predetermined torque is output from the electric motor, the rapid garage control is executed in a state in which the output of the predetermined torque is temporarily stopped, so that the rapid garage control is appropriately executed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In the following, an embodiment of the present disclosure will be described in detail with reference to the drawings.

Figure 1:
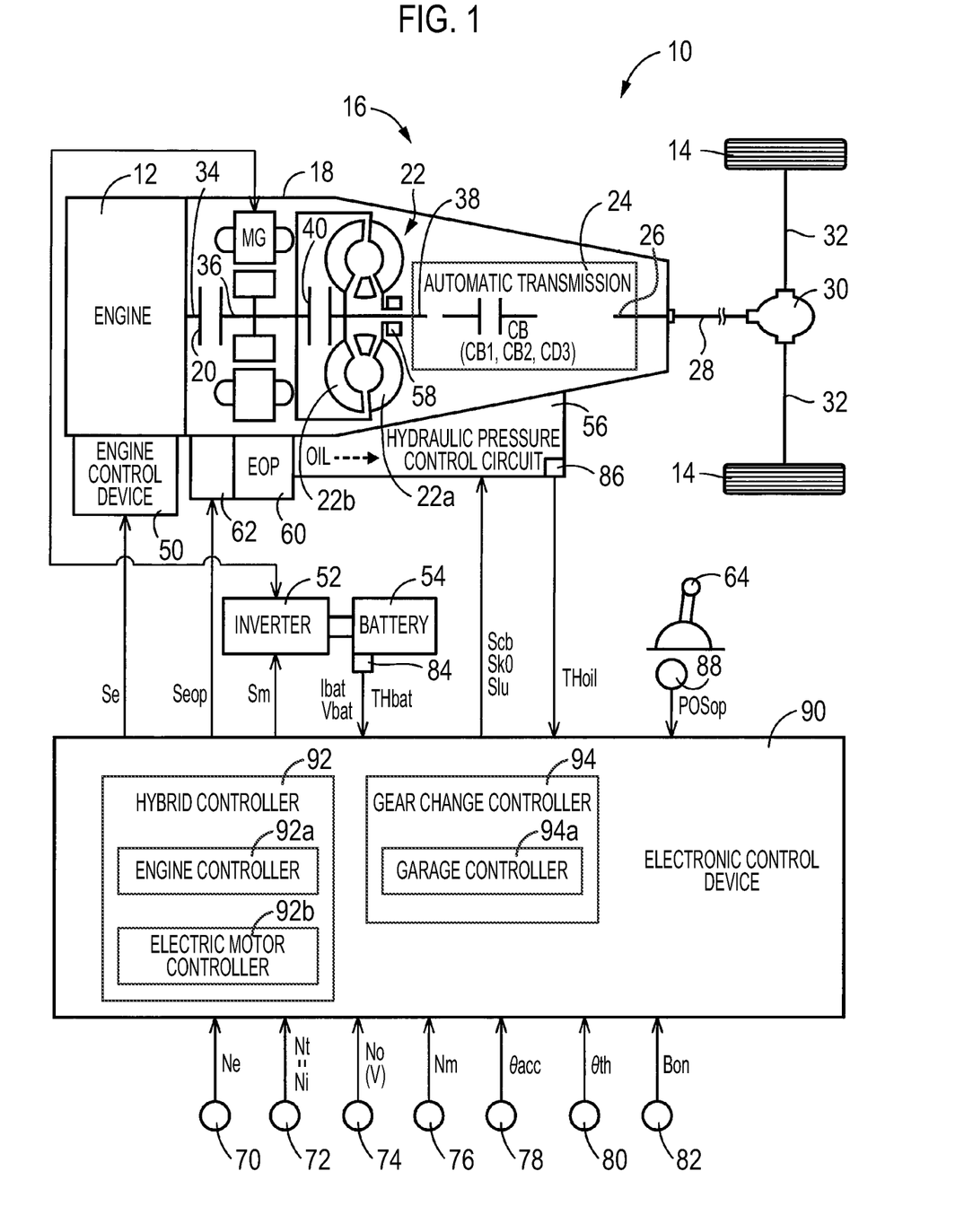
FIG. 1 is a diagram for describing a schematic configuration of a vehicle to which the present disclosure is applied, and is a diagram for describing a control function and a main part of a control system for various controls in the vehicle.

FIG. 1 is a diagram for describing a schematic configuration of a vehicle 10 to which the present disclosure is applied, and is a diagram for describing a control function and a main part of a control system for various controls in the vehicle 10. In FIG. 1, the vehicle 10 is a hybrid vehicle including an engine 12 and an electric motor MG that are drive force sources for traveling. Moreover, the vehicle 10 includes drive wheels 14 and a power transmission device 16 provided in a power transmission path between the engine 12 and the drive wheels 14.

The engine 12 is a known internal combustion engine, such as a gasoline engine or a diesel engine. In the engine 12, an engine torque Te that is an output torque of the engine 12 is controlled by controlling an engine control device 50 including a throttle actuator, a fuel injection device, an ignition device, or the like provided in the vehicle 10 by an electronic control device 90 to be described below.

The electric motor MG is a rotating electric machine having a function as a motor that generates mechanical power from electric power and a function as a generator that generates the electric power from the mechanical power, and is a so-called motor generator. The electric motor MG is connected to a battery 54 provided in the vehicle 10 via an inverter 52 provided in the vehicle 10. The battery 54 is a power storage device that transmits and receives the electric power to and from the electric motor MG. In the electric motor MG, an MG torque Tm that is an output torque of the electric motor MG is controlled by controlling the inverter 52 by the electronic control device 90 to be described below. In a case where a rotation direction of the electric motor MG is a positive rotation that is the same rotation direction as when the engine 12 is operated, the MG torque Tm is, for example, a powering torque at a positive torque on an acceleration side and a regenerative torque at a negative torque on a deceleration side. Unless otherwise specified, the electric power is also the same meaning as electric energy. Unless otherwise specified, the power is also the same meaning as the torque or the force.

The power transmission device 16 includes a K0 clutch 20, a torque converter 22, an automatic transmission 24, and the like in a case 18 that is a non-rotating member attached to a vehicle body. The K0 clutch 20 is a clutch provided between the engine 12 and the electric motor MG in the power transmission path between the engine 12 and the drive wheels 14. The torque converter 22 is connected to the engine 12 via the K0 clutch 20. The automatic transmission 24 is connected to the torque converter 22, and is interposed in the power transmission path between the torque converter 22 and the drive wheels 14. Each of the torque converter 22 and the automatic transmission 24 form a part of the power transmission path between the drive force sources (engine 12 and electric motor MG) and the drive wheels 14. Moreover, the power transmission device 16 includes a propeller shaft 28 connected to a transmission output shaft 26 that is an output rotating member of the automatic transmission 24, a differential gear 30 connected to the propeller shaft 28, a pair of drive shafts 32 connected to the differential gear 30, and the like. Moreover, the power transmission device 16 includes an engine connecting shaft 34 that connects the engine 12 and the K0 clutch 20, an electric motor connecting shaft 36 that connects the K0 clutch 20 and the torque converter 22, and the like.

The electric motor MG is connected to the electric motor connecting shaft 36 in the case 18 such that the power can be transmitted. That is, the electric motor MG is connected to the power transmission path between the K0 clutch 20 and the torque converter 22 such that the power can be transmitted. From a different point of view, the electric motor MG is connected to the torque converter 22 or the automatic transmission 24 such that the power can be transmitted without using the K0 clutch 20.

The torque converter 22 includes a pump impeller 22a connected to the electric motor connecting shaft 36, and a turbine impeller 22b connected to a transmission input shaft 38 that is an input rotating member of the automatic transmission 24. The torque converter 22 is a hydraulic transmission device that transmits the drive force from each of the drive force sources (engine 12 and electric motor MG) to the automatic transmission 24 via fluid. The torque converter 22 includes a LU clutch 40 as a direct clutch connecting the pump impeller 22a and the turbine impeller 22b, that is, the electric motor connecting shaft 36 and the transmission input shaft 38. The LU clutch 40 is a known lock-up clutch.

The automatic transmission 24 is a known planetary gear type automatic transmission including, for example, one set or a plurality of sets of planetary gear devices (not shown) and a plurality of engagement devices CB. For example, the engagement devices CB are known hydraulic friction engagement devices. In each of the engagement devices CB, an operation state, such as an engaged state or a disengaged state, that is, a control state is switched by changing a CB torque Tcb that is each torque capacity by a CB hydraulic pressure PRcb that is an adjusted hydraulic pressure supplied from a hydraulic pressure control circuit 56.

The automatic transmission 24 is a multi-stage transmission in which any gear stage among a plurality of gear stages having different gear ratios γ at (=AT input rotation speed Ni/AT output rotation speed No) is formed by the engagement of any engagement device among the engagement devices CB. In the automatic transmission 24, the gear stage to be formed is switched by switching the control state of the engagement device involved in a gear change of the automatic transmission 24 among the engagement devices CB depending on an accelerator operation of a driver, a vehicle speed V, or the like by the electronic control device 90 to be described below. That is, in a gear change control of the automatic transmission 24, for example, a so-called clutch-to-clutch gear change in which the gear change is executed by the disengagement of a disengagement-side engagement device and the engagement of an engagement-side engagement device is executed. The disengagement-side engagement device is an engagement device that is put into the engaged state before the automatic transmission 24 among the engagement devices involved in the gear change changes gear, and is controlled from the engaged state to the disengaged state in the gear change transition of the automatic transmission 24. The engagement-side engagement device is an engagement device that is put into the disengaged state before the automatic transmission 24 among the engagement devices involved in the gear change changes gear, and is controlled from the disengaged state to the engaged state in the gear change transition of the automatic transmission 24. The AT input rotation speed Ni is the rotation speed of the transmission input shaft 38, and is the input rotation speed of the automatic transmission 24. The AT input rotation speed Ni is the same value as a turbine rotation speed Nt that is the output rotation speed of the torque converter 22. It is possible to represent the AT input rotation speed Ni by the turbine rotation speed Nt. The AT output rotation speed No is the rotation speed of the transmission output shaft 26, and is the output rotation speed of the automatic transmission 24.

The K0 clutch 20 is a hydraulic friction engagement device configured by, for example, a multi-plate type or single-plate type clutch. In the K0 clutch 20, the control state, such as the engaged state or the disengaged state, is switched by changing a K0 torque Tk0 that is the torque capacity of the K0 clutch 20 by a K0 hydraulic pressure PRk0 that is an adjusted hydraulic pressure supplied from the hydraulic pressure control circuit 56.

In the vehicle 10, in the engaged state of the K0 clutch 20, the engine 12 and the torque converter 22 are connected such that the power can be transmitted. On the other hand, in the disengaged state of the K0 clutch 20, the power transmission between the engine 12 and the torque converter 22 is cut off. The electric motor MG is connected to the torque converter 22, so that the K0 clutch 20 functions as a clutch that connects and disconnects the engine 12 to and from the electric motor MG.

In the power transmission device 16, the power output from the engine 12 is transmitted to the drive wheels 14 from the engine connecting shaft 34 sequentially via the K0 clutch 20, the electric motor connecting shaft 36, the torque converter 22, the automatic transmission 24, the propeller shaft 28, the differential gear 30, the drive shafts 32, and the like in a case where the K0 clutch 20 is engaged. Moreover, the power output from the electric motor MG is transmitted to the drive wheels 14 from the electric motor connecting shaft 36 sequentially via the torque converter 22, the automatic transmission 24, the propeller shaft 28, the differential gear 30, the drive shafts 32, and the like regardless of the control state of the K0 clutch 20.

The vehicle 10 includes an MOP 58 that is a mechanical oil pump, an EOP 60 that is an electric oil pump, a pump motor 62, and the like. The MOP 58 is connected to the pump impeller 22a and is rotationally driven by the drive force sources (engine 12 and electric motor MG) to discharge a hydraulic oil OIL used in the power transmission device 16. The pump motor 62 is a motor dedicated to the EOP 60 for rotationally driving the EOP 60. The EOP 60 is rotationally driven by the pump motor 62 to discharge the hydraulic oil OIL. The hydraulic oil OIL discharged by MOP 58 or EOP 60 is supplied to the hydraulic pressure control circuit 56. The hydraulic pressure control circuit 56 supplies the CB hydraulic pressure PRcb, the K0 hydraulic pressure PRk0, and the like that are adjusted based on the hydraulic oil OIL discharged by MOP 58 and/or EOP 60.

The vehicle 10 further includes the electronic control device 90 including a control device of the vehicle 10. For example, the electronic control device 90 includes a so-called microcomputer including a CPU, a RAM, a ROM, and an input and output interface, and the CPU executes various controls of the vehicle 10 by performing signal processing in accordance with a program stored in the ROM in advance while using a transitory storage function of the RAM. The electronic control device 90 includes computers for an engine control, an electric motor control, a hydraulic pressure control, and the like, as needed.

Various signals (for example, an engine rotation speed Ne that is the rotation speed of the engine 12, the turbine rotation speed Nt that is the same value as the AT input rotation speed Ni, the AT output rotation speed No corresponding to the vehicle speed V, an MG rotation speed Nm that is the rotation speed of the electric motor MG, an accelerator operation amount θacc that is an accelerator operation amount of the driver that represents the magnitude of an acceleration operation of the driver, a throttle valve opening degree θth that is an opening degree of an electronic throttle valve, a brake-on signal Bon that is a signal indicating a state in which a brake pedal for operating a wheel brake is operated by the driver, a battery temperature THbat, a battery charge/discharge current Ibat, or a battery voltage Vbat of the battery 54, a hydraulic oil temperature THoil that is a temperature of the hydraulic oil OIL in the hydraulic pressure control circuit 56, and an operation position POSop indicating a position at which a shift lever 64 provided in the vehicle 10 is operated) based on detection values by various sensors (for example, an engine rotation speed sensor 70, a turbine rotation speed sensor 72, an output rotation speed sensor 74, an MG rotation speed sensor 76, an accelerator operation amount sensor 78, a throttle valve opening degree sensor 80, a brake pedal sensor 82, a battery sensor 84, an oil temperature sensor 86, and a shift position sensor 88) and the like provided in the vehicle 10 are supplied to the electronic control device 90.

The shift lever 64 is a shift operation member operated by the driver to any operation position among a plurality of the operation positions POSop. The operation position POSop is a signal indicating a state in which any shift position among a plurality of the shift positions of the automatic transmission 24 is selected, and includes P, R, N, and D operation positions, for example. The shift position of the automatic transmission 24 includes P, R, N, and D positions, for example.

The P operation position is a parking operation position for selecting the P position that is a parking position of the automatic transmission 24. The P position of the automatic transmission 24 is the shift position of the automatic transmission 24 at which the automatic transmission 24 is put into a neutral state and the rotation of the transmission output shaft 26 is mechanically blocked. The neutral state of the automatic transmission 24 is a state in which the automatic transmission 24 cannot transmit the drive force, and is realized by, for example, putting all the engagement devices CB into the disengaged state and cutting the power transmission in the automatic transmission 24 off. The state in which the rotation of the transmission output shaft 26 is mechanically blocked is a state in which the transmission output shaft 26 is fixed so as not to be able to be rotated by a known parking lock mechanism provided in the vehicle 10. The R operation position is a reverse travel operation position for selecting the R position that is a reverse travel position of the automatic transmission 24. The R position of the automatic transmission 24 is the shift position of the automatic transmission 24 at which reverse traveling of the vehicle 10 is possible. The N operation position is a neutral operation position for selecting the N position that is a neutral position of the automatic transmission 24. The N position of the automatic transmission 24 is the shift position of the automatic transmission 24 at which the automatic transmission 24 is put into the neutral state. The D operation position is a forward travel operation position for selecting the D position that is a forward travel position of the automatic transmission 24. The D position of the automatic transmission 24 is the shift position of the automatic transmission 24 at which the automatic gear change control of the automatic transmission 24 is executed to enable the vehicle 10 to travel forward. The P position or the N position of the automatic transmission 24 is a non-traveling position of the automatic transmission 24 at which the automatic transmission 24 cannot transmit the drive force from each of the drive force sources (engine 12 and electric motor MG). The R position or the D position of the automatic transmission 24 is a traveling position of the automatic transmission 24 at which the automatic transmission 24 can transmit the drive force from each of the drive force sources.

Various command signals (for example, an engine control command signal Se for controlling the engine 12, an MG control command signal Sm for controlling the electric motor MG, a CB hydraulic pressure control command signal Scb for controlling the engagement devices CB, a K0 hydraulic pressure control command signal Sk0 for controlling the K0 clutch 20, a LU hydraulic pressure control command signal Slu for controlling the LU clutch 40, and an EOP control command signal Seop for controlling the EOP 60) are output from the electronic control device 90 to the devices (for example, the engine control device 50, the inverter 52, the hydraulic pressure control circuit 56, and the pump motor 62) provided in the vehicle 10.

The electronic control device 90 includes hybrid control means, that is, a hybrid controller 92, and gear change control means, that is, a gear change controller 94, in order to realize various controls in the vehicle 10.

The hybrid controller 92 has a function as engine control means that controls the operation of the engine 12, that is, an engine controller 92a, and a function as electric motor control means that controls the operation of the electric motor MG via the inverter 52, that is, an electric motor controller 92b, and executes a hybrid drive control and the like by the engine 12 and the electric motor MG by the control functions.

The hybrid controller 92 calculates a drive request amount for the vehicle 10 by the driver, for example, by applying the accelerator operation amount θacc and the vehicle speed V to a drive request amount map. The drive request amount map is a relationship that is obtained experimentally or in design and stored in advance, that is, a predetermined relationship. The drive request amount is, for example, a request drive torque Trdem in the drive wheels 14. From a different point of view, the request drive torque Trdem [Nm] is request drive power Prdem [W] at the vehicle speed V at that time. As the drive request amount, request drive force Frdem [N] in the drive wheels 14, a request AT output torque in the transmission output shaft 26, and the like can also be used. Alternatively, the accelerator operation amount θacc, the throttle valve opening degree θth, or the like may be simply used as the drive request amount. In the calculation of the drive request amount, the AT output rotation speed No and the like may be used instead of the vehicle speed V.

The hybrid controller 92 outputs the engine control command signal Se for controlling the engine 12 ad the MG control command signal Sm for controlling the electric motor MG such that the request drive power Prdem is realized in consideration on a transmission loss, an auxiliary load, the gear ratio γat of the automatic transmission 24, a chargeable electric power Win or dischargeable electric power Wout of the battery 54, and the like. The engine control command signal Se is, for example, a command value of engine power Pe that is power of the engine 12 that outputs the engine torque Te at the engine rotation speed Ne at that time. The MG control command signal Sm is, for example, a command value of electric power consumption Wm of the electric motor MG that outputs the MG torque Tm at the MG rotation speed Nm at that time.

The chargeable electric power Win of the battery 54 is the maximum electric power that can be input and defines a limit of the input power of the battery 54, and indicates a limit of the input electric power of the battery 54. The dischargeable electric power Wout of the battery 54 is the maximum electric power that can be output and defines a limit of the output power of the battery 54, and indicates a limit of the output electric power of the battery 54. The chargeable electric power Win or the dischargeable electric power Wout of the battery 54 is calculated by the electronic control device 90 based on, for example, the battery temperature THbat and a state-of-charge value SOC [%] of the battery 54. The state-of-charge value SOC of the battery 54 is a value indicating a state of charge corresponding to a charge amount of the battery 54, and is calculated by the electronic control device 90 based on, for example, the battery charge/discharge current Ibat and the battery voltage Vbat.

In a case where the request drive torque Trdem can be covered solely by the output of the electric motor MG, the hybrid controller 92 sets a traveling mode to a motor traveling (=EV traveling) mode. The EV traveling mode is a traveling mode in which the vehicle can travel by the drive force from the electric motor MG in a state in which the operation of the engine 12 is stopped. In the EV traveling mode, the hybrid controller 92 performs EV traveling in which the vehicle travels by outputting the drive force from solely the electric motor MG among the drive force sources (engine 12 and electric motor MG) in the disengaged state of the K0 clutch 20. On the other hand, in a case where the request drive torque Trdem cannot be covered unless at least the output of the engine 12 is used, the hybrid controller 92 sets the traveling mode to an engine traveling mode, that is, a hybrid traveling (=HV traveling) mode. In the HV traveling mode, the hybrid controller 92 performs engine traveling in which the vehicle travels by outputting the drive force from at least the engine 12 among the drive force sources (engine 12 and electric motor MG) in the engaged state of the K0 clutch 20, that is, HV traveling. On the other hand, even in a case where the request drive torque Trdem can be covered solely by the output of the electric motor MG, the hybrid controller 92 establishes the HV traveling mode when the state-of-charge value SOC of the battery 54 is less than a predetermined engine activation threshold value or when warming up of the engine 12 and the like is needed. The engine activation threshold value is a predetermined threshold value for determining that the state-of-charge value SOC needs to forcibly activate the engine 12 to charge the battery 54.

For example, in a case where the engine 12 is put into a stopped state, the electric motor controller 92b executes an MG start-stop control that is a start-stop control of the electric motor MG. The MG idling control is, for example, a control in which the MG rotation speed Nm is controlled to an MG idle rotation speed that is an idling rotation speed of the electric motor MG having a rotation speed equal to or higher than a predetermined rotation speed Nmf, and the electric motor MG is put into an idle state. The MG idling control is a control of outputting, from the electric motor MG, the predetermined torque for causing the creep phenomenon that the vehicle 10 is slowly moved in a state in which the accelerator is turned off by turning the brake off during temporary stop under a situation in which the accelerator is turned off in the stopped state of the engine 12. The predetermined torque is, for example, a creep torque Tcr for causing the vehicle 10 to travel in so-called creep traveling when a brake-off operation is performed in a vehicle stopped state and the accelerator remains turned off. The MG idling control by the electric motor controller 92b is executed, for example, when the drive request amount is equal to or less than a predetermined zero determination threshold value that can be determined as zero, and the shift lever 64 is at the D operation position or the R operation position in the EV traveling mode. When the drive request amount is equal to or less than the zero determination threshold value is, for example, when the accelerator operation amount θacc is determined to be zero and the accelerator is turned off.

The gear change controller 94 determines the gear change of the automatic transmission 24 by using, for example, a gear change map having a predetermined relationship, and outputs, to the hydraulic pressure control circuit 56, the CB hydraulic pressure control command signal Scb for executing the gear change control of the automatic transmission 24, as needed. In the gear change control of the automatic transmission 24, the gear change controller 94 performs the gear change of the automatic transmission 24 by, for example, switching the disengagement-side engagement device to the disengaged state and switching the engagement-side engagement device to the engaged state. The gear change map has, for example, the predetermined relationship having a gear change line for determining the gear change of the automatic transmission 24 on two-dimensional coordinates with the vehicle speed V and the request drive torque Trdem as variables. In the gear change map, the AT output rotation speed No or the like may be used instead of the vehicle speed V, or the request drive force Frdem, the accelerator operation amount θacc, the throttle valve opening degree θth, or the like may be used instead of the request drive torque Trdem.

The gear change controller 94 includes a function as garage control means, that is, a garage controller 94a that performs a garage control CTg in a case where the garage operation OPg is performed by the driver. The garage operation OPg is one of the operations of the shift lever 64 by the driver, and is, for example, a predetermined switching operation to a state in which one traveling position is selected from a state in which another shift position different from the traveling position of the automatic transmission 24 is selected. In a case where one traveling position of the automatic transmission 24 is the D position of the automatic transmission 24, the other shift position is, for example, the R position of the automatic transmission 24 that is another traveling position of the automatic transmission 24. In this case, the state in which one traveling position of the automatic transmission 24 is selected is a state in which the operation position POSop is set to the D operation position. The state in which the other traveling position of the automatic transmission 24 is selected is a state in which the operation position POSop is set to the R operation position. That is, the garage operation OPg is an R→D operation, for example. Alternatively, the other shift position is, for example, the P position or the N position of the automatic transmission 24 that is the non-traveling position of the automatic transmission 24. In this case, the state in which non-traveling position of the automatic transmission 24 is selected is a state in which the operation position POSop is set to the P operation position or the N operation position. That is, the garage operation OPg is an N (P)→D operation, for example. It should be noted that a D→R operation that is the switching operation from a state in which the D position of the automatic transmission 24 is selected to a state in which the R position is selected, an N (P)→R operation that is the switching operation from a state in which the P position or the N position of the automatic transmission 24 is selected to a state in which the R position is selected, and the like are kinds of the garage operation Opg. Moreover, depending on the operation position POSop of the shift lever 64, the N operation position may be passed through, for example, in the R→D operation or the D→R operation.

In the automatic transmission 24, for example, a first engagement device CB1 and a third engagement device CB3 among the engagement devices CB are put into the engaged state, so that a forward gear stage, for example, a first gear stage is formed and the automatic transmission 24 is set to the D position. Moreover, in the automatic transmission 24, for example, a second engagement device CB2 and the third engagement device CB3 among the engagement devices CB are put into the engaged state, so that a reverse gear stage is formed and the automatic transmission 24 is set to the R position. The garage controller 94a switches, for example, the first engagement device CB1 to the disengaged state to put the automatic transmission 24 into the neutral state in a case where a D→N (P) operation that is the switching operation from a state in which the D position of the automatic transmission 24 is selected to a state in which the P position or the N position is selected is performed by the driver in a state in which the first gear stage is formed. Therefore, the automatic transmission 24 is set to the P position or the N position. The garage controller 94a performs the garage control CTg of switching the first engagement device CB1 to the engaged state and forming the first gear stage in a case where the N (P)→D operation is performed by the driver in the neutral state of the automatic transmission 24 due to the disengaged state of the first engagement device CB1. Therefore, the automatic transmission 24 is set to the D position. Moreover, the garage controller 94a switches, for example, the second engagement device CB2 to the disengaged state to put the automatic transmission 24 into the neutral state in a case where an R→N (P) operation that is the switching operation from a state in which the R position of the automatic transmission 24 is selected to a state in which the P position or the N position is selected is performed by the driver in a state in which the reverse gear stage is formed. Therefore, the automatic transmission 24 is set to the P position or the N position. The garage controller 94a performs the garage control CTg of switching the second engagement device CB2 to the engaged state and forming the reverse gear stage in a case where the N (P)→R operation is performed by the driver in the neutral state of the automatic transmission 24 due to the disengaged state of the second engagement device CB2. Therefore, the automatic transmission 24 is set to the R position. Moreover, the garage controller 94a performs the garage control CTg of, for example, switching the first engagement device CB1 to the disengaged state, switching the second engagement device CB2 to the engaged state, and forming the reverse gear stage in a case where the D→R operation is performed by the driver in a state in which the first gear stage is formed. Therefore, the automatic transmission 24 is switched from the D position to the R position. Moreover, the garage controller 94a performs the garage control CTg of, for example, switching the second engagement device CB2 to the disengaged state, switching the first engagement device CB1 to the engaged state, and forming the first gear stage in a case where the R→D operation is performed by the driver in a state in which the reverse gear stage is formed. Therefore, the automatic transmission 24 is switched from the R position to the D position.

The automatic transmission 24 is a mechanical transmission device including the first engagement device CB1, in which the D position that is the traveling position is formed as the shift position by putting the first engagement device CB1 into the engaged state. The first engagement device CB1 involved in the formation of the D position of the automatic transmission 24 among the engagement devices CB is the predetermined engagement device, particularly, a first predetermined engagement device, and the traveling position of the automatic transmission 24 due to the formation of the D position is particularly a first traveling position. The R position described as an example of the other shift position with respect to the D position of the automatic transmission 24 is the traveling position formed by putting the second engagement device CB2 provided in the automatic transmission 24 into the engaged state. The second engagement device CB2 involved in the formation of the R position of the automatic transmission 24 is the predetermined engagement device different from the first predetermined engagement device, particularly, a second predetermined engagement device, and the traveling position of the automatic transmission 24 due to the formation of the R position is particularly a second traveling position.

Here, in order to suppress the engagement shock, the garage controller 94a outputs, to the hydraulic pressure control circuit 56, the CB hydraulic pressure control command signal Scb for performing a slow engagement command Drls to gradually increase the command pressure of the predetermined engagement device that is the engagement device engaged in the garage control CTg and slowly engage the predetermined engagement device. That is, the garage controller 94a executes a normal garage control CTgn of performing the slow engagement command DRls. The slow engagement command DRls is an engagement command to slowly engage the predetermined engagement device as compared with a quick engagement command DRhs to be described below.

Alternatively, in order to execute the garage control CTg more quickly than the normal garage control CTgn, the garage controller 94a may perform the quick engagement command DRhs to increase the command pressure of the predetermined engagement device stepwise and quickly engages the predetermined engagement device, instead of the slow engagement command DRls. However, in a case where the quick engagement command DRhs is performed when the torque is input to the automatic transmission 24, there is a possibility that the engagement shock is likely to occur or the predetermined engagement device is not quickly engaged even when the quick engagement command DRhs is performed. It is desirable that the quick engagement command DRhs be performed when the torque is not input to the automatic transmission 24. A state in which the torque does not have to be input to the automatic transmission 24 is, for example, when the accelerator is turned off, and when the output of the creep torque Tcr may be temporarily stopped. The state in which the output of the creep torque Tcr may be temporarily stopped is a state of the EV traveling mode in consideration of responsiveness. In a case where the garage operation OPg is performed by the driver, the garage controller 94a performs the quick engagement command DRhs in a state in which the output of the creep torque Tcr is stopped, that is, a creep cut state, and then executes a rapid garage control CTgq of increasing the MG rotation speed Nm to be equal to or higher than the predetermined rotation speed Nmf and outputting the creep torque Tcr from the electric motor MG. The creep cut state is a state in which the output of the creep torque Tcr is prohibited and the MG rotation speed Nm is set to zero. The garage controller 94*a* executes the rapid garage control CTgq in a case where the garage operation OPg is performed by the driver in the EV traveling mode. The quick engagement command DRhs is performed in a state in which the MG rotation speed Nm is set to zero, so that the CB hydraulic pressure PRcb needed for engaging the predetermined engagement device is adjusted based on the hydraulic oil OIL discharged by the EOP 60. It should be noted that the EOP 60 may not be operated in a case where the MOP 58 is connected to another rotating member different from the pump impeller 22*a* and the other rotating member is rotated while the vehicle 10 is traveling in the EV traveling mode.

In a case where the garage operation OPg is, for example, the R→D operation, it is needed to switch the second engagement device CB2 to the disengaged state. Moreover, in the R position, the creep torque Tcr is output from the electric motor MG. In a case where the garage operation OPg that is the R→D operation, is performed by the driver, the garage controller 94*a* outputs the CB hydraulic pressure control command signal Scb for performing a disengagement command DRr to the hydraulic pressure control circuit 56 to reduce the command pressure of the second engagement device CB2 and disengages the second engagement device CB2 before the quick engagement command DRhs with respect to the first engagement device CB1 is started. In a case where the garage operation OPg is performed by the driver in a state in which the creep torque Tcr is output from the electric motor MG, the garage controller 94*a* executes the rapid garage control CTgq in a state in which the output of the creep torque Tcr is temporarily stopped.

By the way, in the rapid garage control CTgq, when the quick engagement command DRhs is performed in a state in which the predetermined engagement device has a differential rotation, there is a possibility that the engagement shock easily occurs. When the vehicle speed V is high, there is a possibility of a state in which the predetermined engagement device has the differential rotation. Alternatively, in the D position or the R position of the automatic transmission 24, when the vehicle 10 is being stopped, the turbine rotation speed Nt is set to zero even when the creep torque Tcr is output. On the other hand, in the P position or the N position of the automatic transmission 24, the automatic transmission 24 is put into the neutral state. Therefore, when the creep torque Tcr is output, the rotation is performed at the turbine rotation speed Nt that is, for example, equal to or higher than the predetermined rotation speed Nmf even when the vehicle 10 is being stopped. In this case, when the N (P)→D (R) operation causes the creep cut state and the MG rotation speed Nm that is the input rotation speed of the torque converter 22 is set to zero from the rotation speed equal to or higher than the predetermined rotation speed Nmf, the turbine rotation speed Nt may not be quickly set to zero depending on the characteristic of the torque converter 22. In this case, there is a possibility of a state in which the predetermined engagement device has the differential rotation even when the creep cut state is set.

Therefore, in a case where the garage operation OPg is performed by the driver, the garage controller 94*a* executes the rapid garage control CTgq when a predetermined start condition CDstf that the engagement shock of the predetermined engagement device is suppressed is established, and prohibits the rapid garage control CTgq when the predetermined start condition CDstf is not established. The garage controller 94*a* executes the normal garage control CTgn when the predetermined start condition CDstf is not established.

The predetermined start condition CDstf includes a condition that the AT input rotation speed Ni, that is, the turbine rotation speed Nt is equal to or lower than a predetermined input rotation speed Nif at which the engagement shock of the predetermined engagement device is suppressed, and a condition that the AT output rotation speed No is equal to or lower than a predetermined output rotation speed Nof at which the engagement shock of the predetermined engagement device is suppressed. The predetermined input rotation speed Nif is zero or a value close to zero, for example. The predetermined output rotation speed Nof is, for example, the AT output rotation speed No when the vehicle is stopped or a state close to a state in which the vehicle is stopped, that is, zero or a value close to zero. When the turbine rotation speed Nt is set to zero or a value close to zero and the AT output rotation speed No is set to zero or a value close to zero, the differential rotation of the predetermined engagement device is zero or a value that is small enough to suppress the engagement shock of the predetermined engagement device.

In a state in which the accelerator is turned on, the MG rotation speed Nm is increased, and there is a possibility of a state in which the predetermined engagement device has the differential rotation. Alternatively, in a case where the EOP 60 is not normally operated, there is a possibility that the predetermined engagement device cannot be appropriately switched to the engaged state and the engagement shock is increased when the quick engagement command DRhs is performed. Alternatively, in a case where the hydraulic oil temperature THoil is low or high, there is a possibility that the predetermined engagement device cannot be appropriately switched to the engaged state and the engagement shock is increased when the quick engagement command DRhs is performed. The predetermined start condition CDstf may include at least one condition among a condition that the drive request amount for the vehicle 10 is equal to or less than the predetermined zero determination threshold value determined as zero, a condition that the EOP 60 is normally operated, and a condition that the hydraulic oil temperature THoil is within a predetermined range in which the quick engagement of the predetermined engagement device can be appropriately performed. The condition that the drive request amount is equal to or less than the zero determination threshold value is, for example, a condition that the accelerator is turned off, but may be a condition that the drive request amount in known cruise control, autonomous vehicle speed control, autonomous driving control, and the like is equal to less than the zero determination threshold value. The condition that the EOP 60 is normally operated is, for example, a condition that the EOP 60 itself does not fail and/or a condition that the EOP 60 can be normally operated in a controlled manner.

Specifically, the hybrid controller 92 determines whether or not the traveling mode is the EV traveling mode.

The garage controller 94*a* determines whether or not the garage operation OPg is performed by the driver. In a case where the hybrid controller 92 determines that the traveling mode is the EV traveling mode and the determination is made that the garage operation OPg is performed by the driver, when the second predetermined engagement device switched to the disengaged state, that is, the disengagement-side engagement device is present in the garage control CTg, the garage controller 94*a* outputs, to the hydraulic pressure control circuit 56, the CB hydraulic pressure control command signal Scb for performing the disengagement command DRr to disengage the disengagement-side engagement device.

In a case where the determination is made that the garage operation OPg is performed by the driver when the hybrid controller 92 determines that the traveling mode is the EV traveling mode, the garage controller 94a determines whether or not the predetermined start condition CDstf is established. In a case where the determination is made that the predetermined start condition CDstf is established, when the creep torque Tcr is output, the garage controller 94a performs an output stop command DRst to stop the output of the creep torque Tcr. The electric motor controller 92b stops the output of the creep torque Tcr based on the output stop command DRst.

The garage controller 94a determines that the garage operation OPg is performed by the driver when the hybrid controller 92 determines that the traveling mode is the EV traveling mode, and determines whether or not the creep cut state is set when the determination is made that the predetermined start condition CDstf is established. The garage controller 94a determines whether or not the creep cut state is set based on whether or not the determination can be made that the MG rotation speed Nm is set to zero, for example.

In a case where the determination is made that the creep cut state is set, the garage controller 94a outputs, to the hydraulic pressure control circuit 56, the CB hydraulic pressure control command signal Scb for performing the quick engagement command DRhs to quickly engage the first predetermined engagement device switched to the engaged state in the garage control CTg, that is, the engagement-side engagement device.

In a case where a predetermined time TMf that can be determined that switching of the engagement-side engagement device to the engaged state in the garage control CTg progresses has elapsed from a point in time when the CB hydraulic pressure control command signal Scb for performing the quick engagement command DRhs is output, the garage controller 94a performs an output command DRop to output the creep torque Tcr. The electric motor controller 92b starts the output of the creep torque Tcr based on the output command DRop.

On the other hand, the garage controller 94a determines that the garage operation OPg is performed by the driver when the hybrid controller 92 determines that the traveling mode is the EV traveling mode, and outputs, to the hydraulic pressure control circuit 56, the CB hydraulic pressure control command signal Scb for performing the slow engagement command DRls to slowly engage the engagement-side engagement device in the garage control CTg in a case where the determination is made that the predetermined start condition CDstf is not established.

Figure 2:
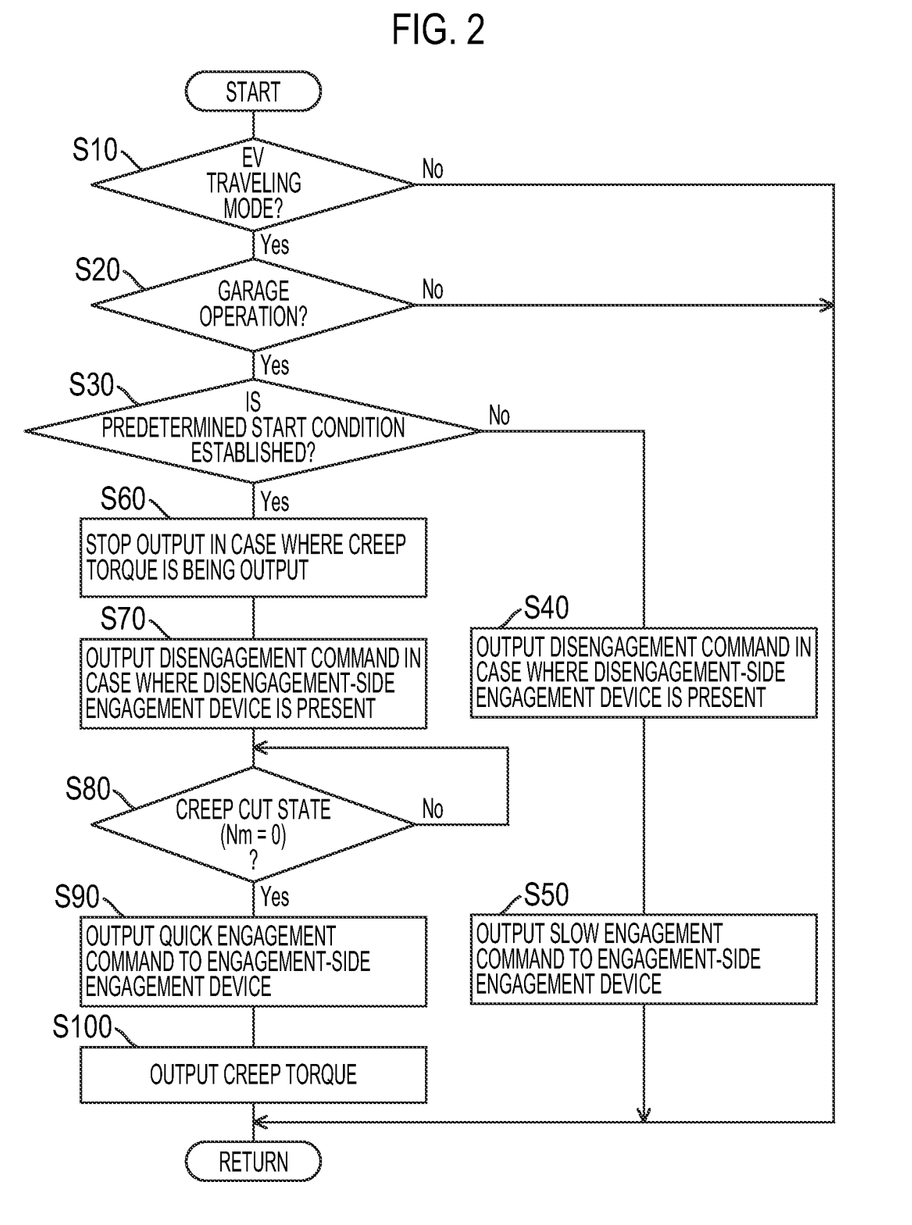
FIG. 2 is a flowchart describing a main part of a control operation of an electronic control device, and is a flowchart for showing the control operation for suppressing a shock and quickly engaging a predetermined engagement device in a case where a garage operation is performed.
Figure 3:
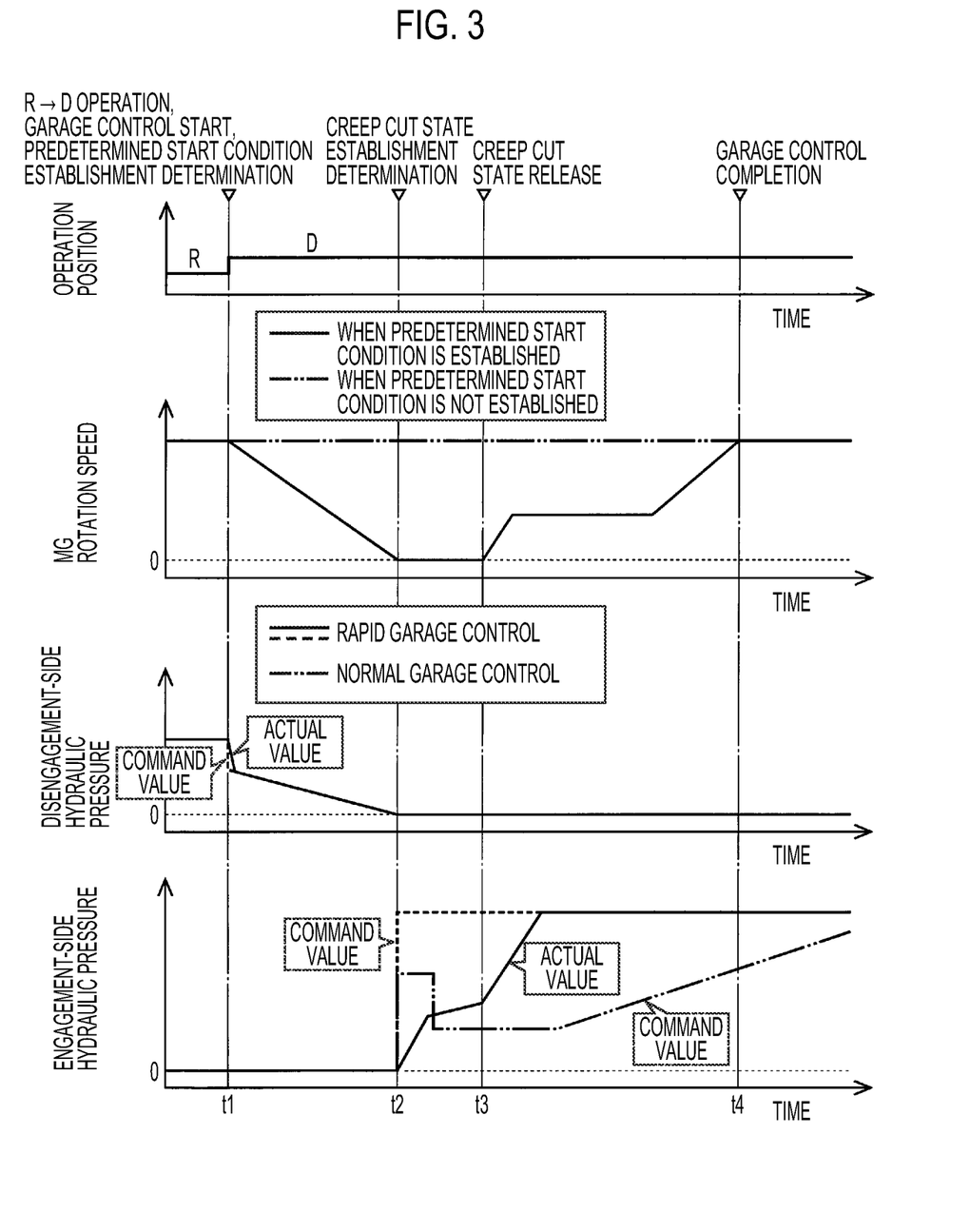
FIG. 3 is a diagram showing an example of a time chart in a case where the control operation shown in the flowchart of FIG. 2 is executed.

FIG. 2 is a flowchart describing a main part of the control operation of the electronic control device 90, is a flowchart for showing the control operation for suppressing the shock and quickly engaging the predetermined engagement device in a case where a garage operation OPg is performed, and is repeatedly executed, for example. FIG. 3 is a diagram showing an example of a time chart in a case where the control operation shown in the flowchart of FIG. 2 is executed.

In FIG. 2, first, in step (hereinafter, step is omitted) S10 corresponding to the function of the hybrid controller 92, a determination is made as to whether or not the traveling mode is the EV traveling mode. In a case where a negative determination is made in S10, the present routine is terminated. In a case where a positive determination is made in S10, a determination is made as to whether the garage operation OPg is performed by the driver in S20 corresponding to the function of the garage controller 94a. In a case where a negative determination is made in S20, the present routine is terminated. In a case where a positive determination is made in S20, a determination is made as to whether or not the predetermined start condition CDstf is established in S30 corresponding to the function of the garage controller 94a. In a case where a negative determination is made in S30, when the disengagement-side engagement device is present in the garage control CTg, the disengagement command DRr to disengage the disengagement-side engagement device is output in S40 corresponding to the function of the garage controller 94a. Next, in S50 corresponding to the function of the garage controller 94a, the slow engagement command DRls to slowly engage the engagement-side engagement device in the garage control CTg is output. In a case where a positive determination is made in S30, the output of the creep torque Tcr is stopped when the creep torque Tcr is output in the S60 corresponding to the functions of the garage controller 94a and the electric motor controller 92b. Next, when the disengagement-side engagement device is present in the garage control CTg, the disengagement command DRr to disengage the disengagement-side engagement device is output in S70 corresponding to the function of the garage controller 94a. Next, in S80 corresponding to the function of the garage controller 94a, a determination is made as to whether or not the creep cut state is set. In a case where a negative determination is made in S80, S80 is repeatedly executed. Next, in a case where a positive determination is made in S80, in S90 corresponding to the function of the garage controller 94a, the quick engagement command DRhs to quickly engage the engagement-side engagement device in the garage control CTg is output. Next, in S100 corresponding to the functions of the garage controller 94a and the electric motor controller 92b, the output of the creep torque Tcr is started after the elapse of the predetermined time TMf.

FIG. 3 is a diagram showing an example of a case where the R→D operation is performed by the driver when the creep torque Tcr is output at the R position of the automatic transmission 24 in the EV traveling mode. In FIG. 3, point in time t1 indicates a point in time when the garage control CTg is started as the R→D operation is performed by the driver. In the garage control CTg, switching from the R position to the D position of the automatic transmission 24, that is, the gear change control of disengaging the second engagement device CB2 and engaging the first engagement device CB1 is executed. A disengagement-side hydraulic pressure indicates the CB hydraulic pressure PRcb of the second engagement device CB2 that is the disengagement-side engagement device. An engagement-side hydraulic pressure indicates the CB hydraulic pressure PRcb of the first engagement device CB1 that is the engagement-side engagement device. In each of the disengagement-side hydraulic pressure and the engagement-side hydraulic pressure, an actual value indicated by a solid line is an actual pressure, and a command value indicated by a broken line or a two-dot chain line is the command pressure. Moreover, at a start point in time of the garage control CTg, a determination is made as to whether or not the predetermined start condition CDstf is established. In the garage control CTg, in a case where the predetermined start condition CDstf is established, the creep cut state is temporarily set as shown by the solid line at the MG rotation speed Nm. On the other hand, in a case where the predetermined start condition CDstf is not established, the creep cut state is not set as shown by the two-dot chain line at the MG rotation speed Nm. In a case where the predetermined start condition CDstf is not established, the slow engagement command DR1s to disengage the second engagement device CB2 and slowly engage the first engagement device CB1, for example, as shown by the two-dot chain line, the command pressure to be gradually increased to the maximum pressure following a rapid filling command pressure or a fixed pressure standby command pressure is output (see at and after point in time t2). Therefore, the garage control CTg is executed by the normal garage control CTgn. In a case where the predetermined start condition CDstf is established, when the creep cut state is set during the transition of the garage control CTg, that is, when the MG rotation speed Nm is set to zero, the determination is made that the creep cut state is established (see point in time t2). Thereafter, the quick engagement command DRhs to quickly engage the first engagement device CB1, for example, the command pressure to be increased stepwise from the engagement start point in time to the maximum pressure as shown by the broken line is output (see at and after point in time t2). Therefore, the garage control CTg is executed by the rapid garage control CTgq. After the elapse of the predetermined time TMf from a point in time when the quick engagement command DRhs is output, the creep cut state is released and the output of the creep torque Tcr is started (see point in time t3). When the creep torque Tcr is returned to a target value, the garage control CTg is completed (see point in time t4). It should be noted that the actual pressure of the engagement-side hydraulic pressure is shown solely in a case of the rapid garage control CTgq. Moreover, in order to compare the respective engagement-side hydraulic pressures of the normal garage control CTgn and the rapid garage control CTgq, for convenience, the output start of the command pressure of the engagement-side hydraulic pressure in the normal garage control CTgn is set to point in time t2.

As described above, according to the present embodiment, in a case where the garage operation OPg is performed by the driver, the quick engagement command DRhs is performed in the creep cut state, and then the rapid garage control CTgq of increasing the MG rotation speed Nm to be equal to or higher than the predetermined rotation speed Nmf is executed, so that the engagement of the predetermined engagement device caused by the garage operation Opg is quickly performed in a state in which the engagement shock is easily suppressed. Moreover, the rapid garage control CTgq is executed in a case where the predetermined start condition CDstf is established, and is prohibited in a case where the predetermined start condition CDstf is not established, so that the engagement of the predetermined engagement device caused by the garage operation OPg is performed in a state in which the engagement shock is more easily suppressed. Therefore, in a case where the garage operation OPg is performed, it is possible to suppress the shock and quickly engage the predetermined engagement device. That is, in a case where the rapid garage control CTgq is executed, it is possible to suppress the shock and quickly engage the predetermined engagement device.

In addition, according to the present embodiment, the predetermined start condition CDstf includes the condition that the AT input rotation speed Ni is equal to or lower than the predetermined input rotation speed Nif, and the condition that the AT output rotation speed No is equal to or lower than the predetermined output rotation speed Nof, so that the engagement of the predetermined engagement device caused by the garage operation OPg is performed in a state in which the differential rotation of the predetermined engagement device is suppressed, and the engagement shock is surely suppressed.

In addition, according to the present embodiment, the AT input rotation speed Ni is the turbine rotation speed Nt, so that the predetermined start condition CDstf includes the condition that the turbine rotation speed Nt is equal to or lower than the predetermined input rotation speed Nif. Therefore, in a case where the torque converter 22 is provided, even in a case where the creep cut state is set and the MG rotation speed Nm is reduced to be equal to or lower than the predetermined input rotation speed Nif when the turbine rotation speed Nt exceeds the predetermined input rotation speed Nif, the turbine rotation speed Nt may be higher than the MG rotation speed Nm due to the characteristic of the torque converter 22, whereas since the rapid garage control CTgq is executed when the predetermined start condition CDstf including the condition that the turbine rotation speed Nt is equal to or lower than the predetermined input rotation speed Nif is established, the engagement of the predetermined engagement device caused by the garage operation OPg is performed in a state in which the differential rotation of the predetermined engagement device is surely suppressed.

In addition, according to the present embodiment, the predetermined start condition CDstf includes at least one condition among the condition that the drive request amount for the vehicle 10 is equal to or less than the zero determination threshold value, the condition that the EOP 60 is normally operated, and the condition that the hydraulic oil temperature THoil is within the predetermined range, so that the engagement of the predetermined engagement device caused by the garage operation OPg is more easily performed in a state in which the differential rotation of the predetermined engagement device is easily suppressed.

In addition, according to the present embodiment, in a case where the predetermined start condition CDstf is not established, the normal garage control CTgn of performing the slow engagement command DRls is executed, so that the engagement of the predetermined engagement device caused by the garage operation OPg is performed in a state in which the engagement shock is suppressed.

In addition, according to the present embodiment, the other shift position that is the shift position of the automatic transmission 24 before the garage operation OPg is performed is the non-traveling position of the automatic transmission 24, so that it is possible to suppress the shock and quickly engage the predetermined engagement device in a case where the garage operation OPg from the non-traveling position to the traveling position is performed.

In addition, according to the present embodiment, the other shift position is the second traveling position of the automatic transmission 24, so that it is possible to suppress the shock and quickly engage the predetermined engagement device in a case where the garage operation OPg from the second traveling position to the traveling position is performed. Moreover, in a case where the garage operation OPg from the second traveling position to the traveling position is performed, the disengagement command DRr to disengage the second predetermined engagement device is performed before the quick engagement command DRhs is started, switching the shift position from the second traveling position to the traveling position is appropriately executed by the rapid garage control CTgq.

In addition, according to the present embodiment, in a case where the garage operation OPg is performed in the EV traveling mode, the rapid garage control CTgq is executed, so that the rapid garage control CTgq is appropriately executed in a situation in which there is a possibility that the creep torque Tcr is output from the electric motor MG.

In addition, according to the present embodiment, in a case where the garage operation OPg is performed in a state in which the creep torque Tcr is output from the electric motor MG, the rapid garage control CTgq is executed in a state in which the output of the creep torque Tcr is temporarily stopped, so that the rapid garage control CTgq is appropriately executed.

Although the embodiment of the present disclosure has been described in detail based on the drawings, the present disclosure is also applied to other aspects.

For example, in the embodiment described above, the first engagement device CB1 involved in the formation of the D position of the automatic transmission 24 among the engagement devices CB has been described as an example of the predetermined engagement device, particularly, the first predetermined engagement device and the garage operation OPg to the D operation position has been described as an example, but the present disclosure is not limited to this aspect. For example, the present disclosure can be applied even to the garage operation OPg to the R operation position in which the second engagement device CB2 involved in the formation of the R position of the automatic transmission 24 is the first predetermined engagement device. In this case, the first engagement device CB1 involved in the formation of the D position of the automatic transmission 24 is the second predetermined engagement device, and the traveling position of the automatic transmission 24 due to the formation of the R position is the first traveling position, and the traveling position of the automatic transmission 24 due to the formation of the D position is the second traveling position.

In addition, in the embodiment described above, the vehicle 10 including the engine 12, the electric motor MG, and the automatic transmission 24 has been described as an example of the vehicle to which the present disclosure is applied, but the present disclosure is not limited to this aspect. For example, the present disclosure can be applied to an electric vehicle that does not include the engine and uses solely the electric motor as the drive force source, or the hybrid vehicle that provides the automatic transmission in series in a rear stage of a known electric continuously variable transmission. Moreover, in a case where the vehicle is, for example, the electric vehicle, the automatic transmission that transmits the drive force from the electric motor may be replaced with the mechanical transmission device having a simple engagement device. In short, the present disclosure can be applied as long as the vehicle includes the electric motor, and the mechanical transmission device that includes the predetermined engagement device and forms, as the shift position, the traveling position at which the mechanical transmission device can transmit the drive force from the electric motor by putting the predetermined engagement device into the engaged state.

In addition, in the embodiment described above, the planetary gear type automatic transmission has been described as an example of the automatic transmission 24, but the present disclosure is not limited to this aspect. For example, the automatic transmission 24 may be a known dual clutch transmission (DCT), a known belt-type continuously variable transmission, or the like. In a case where the automatic transmission 24 is the DCT, one engagement device of the engagement devices connected to the input shafts of the two systems corresponds to the predetermined engagement device. In a case where the automatic transmission 24 is the belt-type continuously variable transmission, one engagement device of a forward clutch and a reverse brake provided in a known forward and reverse switching device provided together with the belt-type continuously variable transmission corresponds to the predetermined engagement device.

In addition, in the embodiment described above, the torque converter 22 is used as the hydraulic transmission device, but the present disclosure is not limited to this aspect. For example, as the hydraulic transmission device, another hydraulic transmission device, such as a fluid coupling having no torque amplification action, may be used instead of the torque converter 22. Alternatively, the hydraulic transmission device does not always have to be provided, and may be replaced with, for example, a starting clutch.

It should be noted that the above description is merely one embodiment, and the present disclosure can be implemented in an aspect in which various changes and improvements are made based on the knowledge of those skilled in the art.

What is claimed is:

1. A control device of a vehicle including an electric motor, and a mechanical transmission device that includes a predetermined engagement device, in which a traveling position at which the mechanical transmission device is able to transmit drive force from the electric motor is formed as a shift position by putting the predetermined engagement device into an engaged state, the control device comprising:
    an electric motor controller configured to control a rotation speed of the electric motor at a rotation speed equal to or higher than a predetermined rotation speed and output a predetermined torque that causes a creep phenomenon from the electric motor; and
    a garage controller configured to, in a case where a predetermined switching operation from a state in which another shift position different from the traveling position of the mechanical transmission device is selected to a state in which the traveling position is selected is performed by a driver, perform a quick engagement command to increase a command pressure of the predetermined engagement device stepwise and quickly engage the predetermined engagement device in a state in which output of the predetermined torque is stopped, and then execute a rapid garage control of increasing the rotation speed of the electric motor to be equal to or higher than the predetermined rotation speed,
    wherein the garage controller is configured to, in a case where the predetermined switching operation is performed by the driver, execute the rapid garage control when a predetermined start condition that an engagement shock of the predetermined engagement device is suppressed is established, and prohibit the rapid garage control when the predetermined start condition is not established.

2. The control device according to claim 1, wherein the predetermined start condition includes a condition that an input rotation speed of the mechanical transmission device is equal to or lower than a predetermined input rotation speed at which the engagement shock of the predetermined engagement device is suppressed, and a condition that an output rotation speed of the mechanical transmission device is equal to or lower than a predetermined output rotation speed at which the engagement shock of the predetermined engagement device is suppressed.

3. The control device according to claim 2, wherein the input rotation speed of the mechanical transmission device is an output rotation speed of a hydraulic transmission device provided in the vehicle and configured to transmit the drive force from the electric motor to the mechanical transmission device via fluid.

4. The control device according to claim 2, wherein the predetermined start condition includes at least one condition among a condition that a drive request amount for the vehicle is equal to or less than a predetermined zero determination threshold value that is able to be determined as zero, a condition that an electric oil pump provided in the vehicle and configured to supply a hydraulic oil for operating the predetermined engagement device is normally operated, and a condition that a temperature of the hydraulic oil is within a predetermined range in which quick engagement of the predetermined engagement device is able to be appropriately performed.

5. The control device according to claim 1, wherein the garage controller is configured to, in a case where the predetermined start condition is not established, execute a normal garage control of performing a slow engagement command to gradually increase the command pressure of the predetermined engagement device and slowly engage the predetermined engagement device as compared with the quick engagement command.

6. The control device according to claim 1, wherein the other shift position is a non-traveling position at which the mechanical transmission device is not able to transmit the drive force from the electric motor.

7. The control device according to claim 1, wherein:
the other shift position is a second traveling position at which the mechanical transmission device is able to transmit the drive force from the electric motor, the second traveling position being formed by putting a second predetermined engagement device that is provided in the mechanical transmission device and is different from the predetermined engagement device into an engaged state; and
the garage controller is configured to, in a case where the predetermined switching operation from a state in which the second traveling position is selected to a state in which the traveling position is selected is performed by the driver, perform a disengagement command to reduce a command pressure of the second predetermined engagement device and disengage the second predetermined engagement device before the quick engagement command with respect to the predetermined engagement device is started.

8. The control device according to claim 1, wherein the garage controller is configured to, in a case where the predetermined switching operation is performed by the driver in a motor traveling mode in which the vehicle is able to travel by the drive force from the electric motor in a state in which an operation of an engine provided in the vehicle is stopped, execute the rapid garage control.

9. The control device according to claim 1, wherein the garage controller is configured to, in a case where the predetermined switching operation is performed by the driver in a state in which the predetermined torque is output from the electric motor, execute the rapid garage control in a state in which the output of the predetermined torque is temporarily stopped.

* * * * *